Oct. 19, 1943.   R. B. McKINNIS   2,332,099
METHOD FOR STERILIZING CLOSURES FOR CONTAINERS
Filed Dec. 22, 1941   2 Sheets-Sheet 1
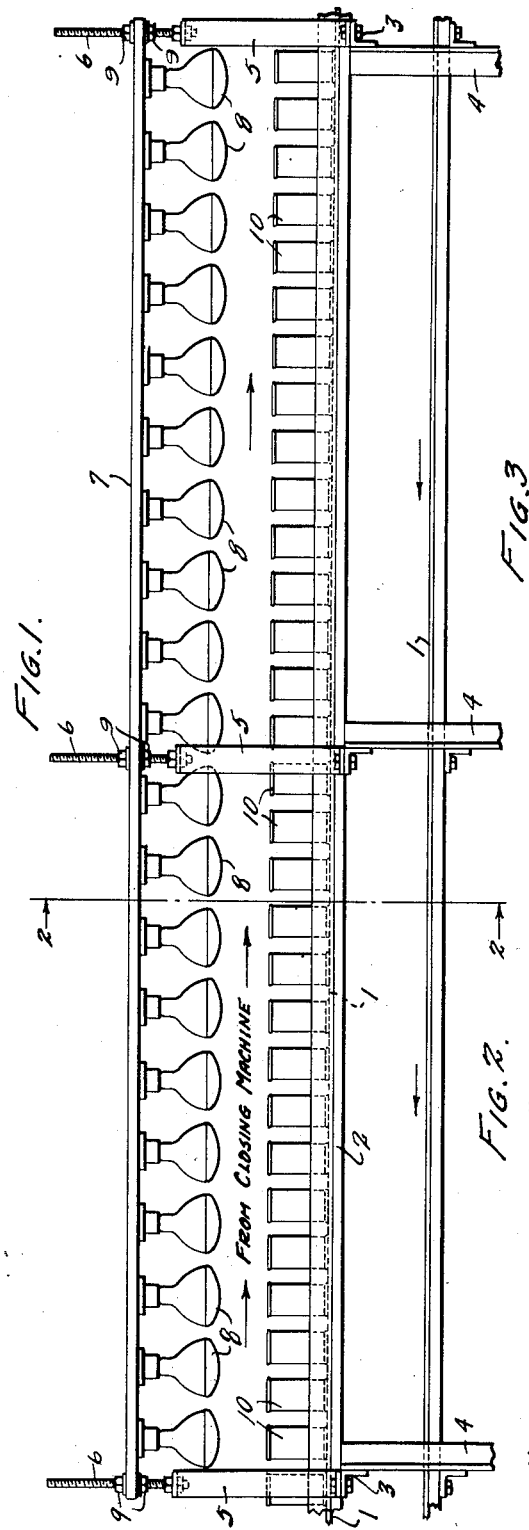
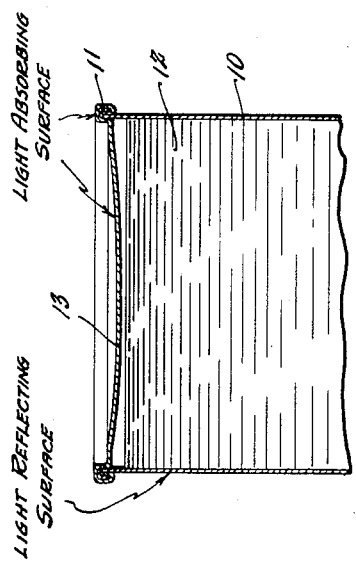
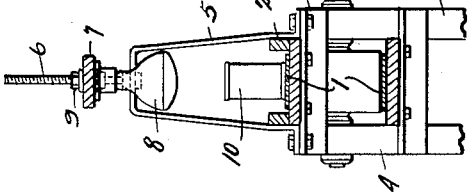
Inventor
RONALD B. McKINNIS
By Semmes, Keegin, Beale & Semmes
Attorneys

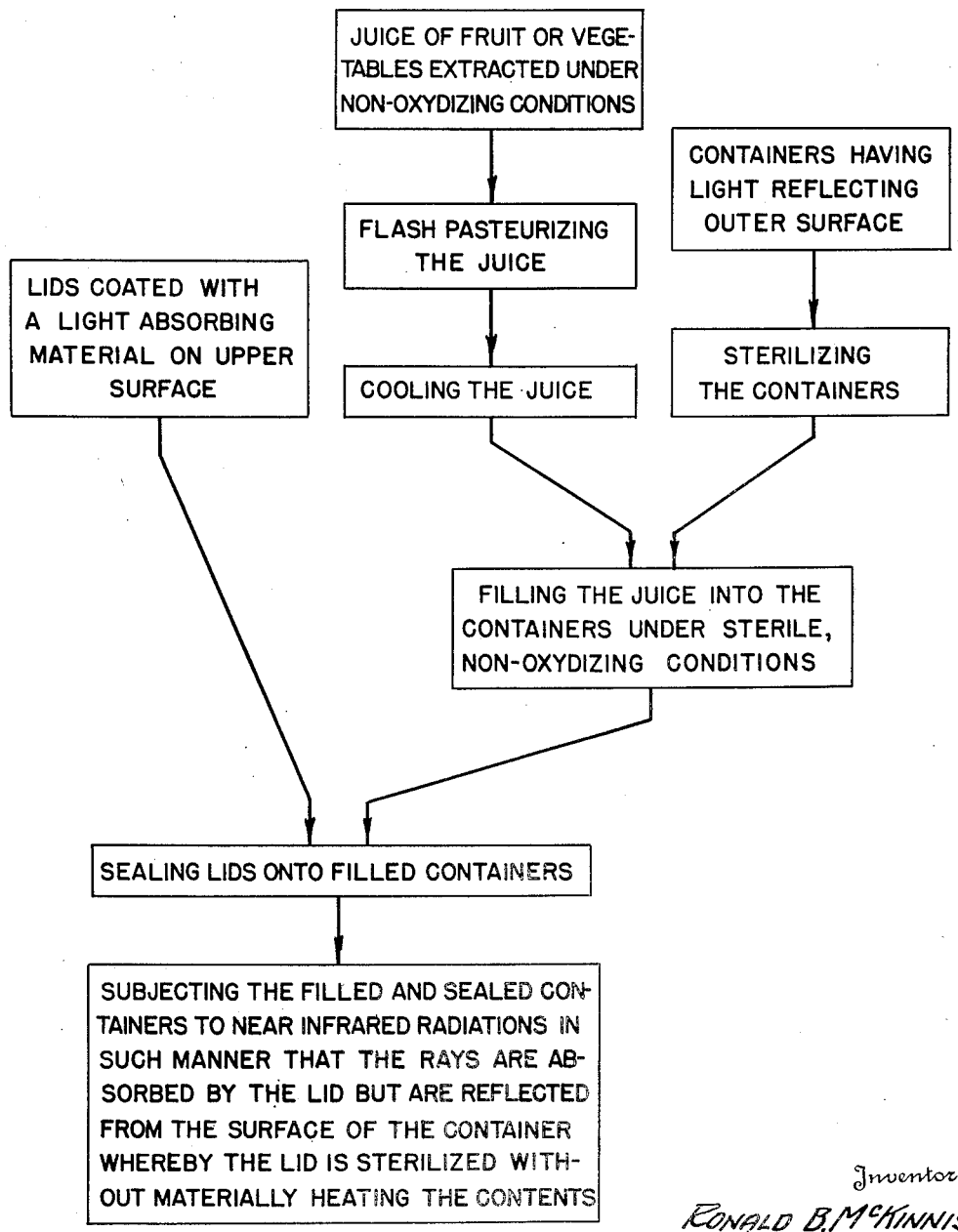

Patented Oct. 19, 1943

2,332,099

UNITED STATES PATENT OFFICE 2,332,099

METHOD FOR STERILIZING CLOSURES FOR CONTAINERS

Ronald B. McKinnis, Winter Haven, Fla., assignor, by mesne assignments, to Ronald B. McKinnis, doing business as McKinnis Foods, Winter Haven, Fla.

Application December 22, 1941, Serial No. 424,063

8 Claims. (Cl. 21—2)

My present invention relates generically to sterilization and specifically to methods whereby closures for containers are sterilized by means of infra-red radiations, particularly those whose wavelength lie in the band between 6500 and 14000 Å.

It is well known that many liquid foods, particularly fruit and vegetable juices, and a few solid foods are filled into the container subsequent to sterilization. While it is true that the contents of the container have been sterilized and the container may be sterilized immediately before filling, its closure or lid are not sterile. The empty container can be sterilized readily and filled with the hot food product, which, of course, effects a further sterilization. However, the closure or lid is quite difficult to sterilize and position on the container in a sterile condition. Normally, the heated contents of the container are employed to sterilize the container and lid or another heat treatment, such as a water bath, hot water spray or steam may be used to achieve the necessary results.

It is the object of the present invention to provide a process and means for carrying out the process whereby the closure or lid of the container can be quickly sterilized without the prolonged heating of the contents of the container.

More specifically, the closures to be affixed to the containers have their top or exposed surface coated with an enamel or other material which will absorb infra-red radiations thereby enabling this area of the closure to be heated by surch radiations. The container itself being of shiny reflecting tin plate will not absorb the radiations to the extent afforded by the coated upper surface of the closure.

To carry out my method the sealed containers, after they leave the closing machine, are moved past infra-red lamps so that the rays from the lamps impinge directly on the coated closures. Sufficient concentration of the radiation and the time of the radiation is given to permit heating of the lid for sterilization.

Immediately after the closure has been sterilized the container and its contents are cooled in any of the conventional manners.

By virtue of the present method the closure is sterilized without substantially heating the contents of the container. Of course, the contents of the container may be sterilized as by flash pasteurization without any change of flavor, but the additional heating which is required to sterilize both the container and the closure consumes sufficient time to impart a cooked flavor to the contents. This is particularly objectionable in processes for canning fruit and vegetable juices. To the best of my knowledge prior to my invention there have been no satisfactory methods for sterilizing the closure of the container.

I might state that the sterile filling of cooled juice into sterile containers and sealing the containers with sterile lids in a sterile atmosphere has been accomplished. However, due to the complexity of the apparatus required for performing the process, it has never proven practical. In addition, juice has been sterilized in the container with the simultaneous sterilization of the container and closure, but this practice has been difficult to operate and, of even greater importance, has been most unreliable.

Among the objects of the present invention are the following:

First, to provide a method and apparatus for sterilizing closures for containers containing food products employing infra-red radiations.

Second, to provide a method and apparatus for sterilizing the lids of containers containing food stuffs which does not heat the contents of the container.

Third, to provide a method for sterilizing the closures of filled containers which can be easily and cheaply performed and which requires a minimum of time and equipment.

Fourth, to shorten the time for sterilization of the lids of filled containers by employing the radiant energy from infra-red lamps to heat the lids.

Further objects of the invention will become more fully apparent from a reading of the following description in the drawings:

Figure 1 is a side elevational view showing the preferred form for carrying out my invention;

Figure 2 is a transverse sectional view taken along the line 2—2 of Figure 1, looking in the direction of the arrows;

Figure 3 is a fragmental transverse sectional view of a container illustrating the mode in which the closure or lid is treated;

Figure 4 is a flow chart, diagrammatically illustrating the steps of my novel process.

Referring to the drawings and more particularly to Figure 4, it will be noted that I have shown the various steps embodying my process. After the juice has been extracted from the whole fruit under conditions which prevent positively the access of oxygen to the juice, the juice is subjected to a flash pasteurization step. After its pasteurization, the juice is then cooled to the desired temperature.

The containers into which the juice is to be introduced in the filling machine are subjected to sterilization in any convenient manner. After the containers have been sterilized the cooled juice is introduced therein under sterile non-oxidizing conditions, such as set forth in my co-pending application Serial No. 402,830, filed July 17, 1941.

The lids or closures have their upper or exposed surface coated with an enamel or other liquid absorbing material. The closures are then sealed onto the filled containers in a closing machine.

After the sealed containers leave the closing machine they are subjected to the action of infra-red radiations in such a manner that the rays are absorbed by the lid, but are mostly reflected from the surface of the container, whereby the lid is sterilized without materially heating the juice in the container.

The means whereby my process above described is carried out is clearly depicted in Figure 1. Adjacent to the exit of the closing machine (not shown) is an endless conveyor 1 that is movable through a trough-shaped support 2, which is carried by a base 3. The base 3 is supported above the floor by legs 4. Movement may be imparted to the conveyor 1 in any desirable manner and, may be synchronized with the movement of the closing machine to provide the correct time of exposure of the containers delivered from the closing machine.

Spaced longitudinally of the base 3 are a plurality of brackets 5. Secured to the horizontal portion of each bracket is the lower end of a threaded rod 6. Each rod 6 extends through an aperture formed in a plate 7 which is adapted to support on its lower face a plurality of infra-red lamps 8 contained in suitably focused reflectors. By virtue of the bolts 9 associated with each threaded rod 6 it is apparent that the vertical position of the lamps 8 with respect to the conveyor 1 can be varied to compensate for a difference in the height of the containers being treated.

Referring to Figure 3 I have shown a container 10 having secured thereto a lid 11 after juice 12 has been introduced into the container. The side walls of the container may be tin plated to present a light reflecting surface whereas black enamel coat 13, or a coat of other color or light absorbing material, is provided on the upper face of the lid. This light absorbing material will permit the rays emitted from the lamps 8 to be absorbed by the lid to heat it, yet these rays will be reflected from the side walls of the container, whereby there will be no material heating of the juice in the container.

While it is thought that the mode of operation is readily apparent from the above, the operation may be summarized briefly as follows. When the containers 10 leave the closing machine, they are carried by the conveyor 1 beneath the infra-red lamps 8. These lamps are so disposed that the rays are focused on and impinge on the surface 13, and the time of movement of the containers beneath the lamps is so regulated that each container is subjected to the rays for a sufficient period to heat the lid for sterilization.

This method of heating by absorption of infra-red radiations is particularly effective in sterilizing that portion of the lid around its seam adjacent the sealing compound which heretofore has been very difficult to sterilize. Moreover, due to the high rate of energy transfer from the lamp to the lid, the time of heating necessary for sterilization is greatly shortened thereby minimizing the amount of heat conduction to the contents.

I claim:

1. A method of sterilizing sealed closures of containers filled with food stuff comprising subjecting the sealed closure to infra-red radiations.

2. A method of sterilizing sealed closures of containers filled with food substance comprising coating the closure with a light absorbing material and subjecting the closure to infra-red radiations so that the rays are absorbed by the coating to sterilize the closure.

3. A method of sterilizing sealed closures of containers filled with food substance comprising coating the closure with enamel, and subjecting the coated closure to infra-red radiations so that the rays are absorbed by the coating to sterilize the closure without heating materially the contents of the container.

4. A method of sterilizing sealed closures of containers filled with food substance comprising subjecting the closure to infra-red radiations whose wavelength lie in the band between 6500 and 14000 Angstrom units.

5. A method of sterilizing sealed closures of containers filled with food substance comprising coating the exposed portion of the closure with a light absorbing material, and subjecting the closure to infra-red radiations whose wavelength lie in the band between 6500 and 14000 Angstrom units whereby the rays are absorbed by the material to sterilize the closure without heating materially the contents of the container.

6. A method of sterilizing sealed closures of containers filled with oxidizable liquid comprising the steps of coating the exposed area of the closure with enamel, and subjecting only the coated area of the closure to infra-red radiations so that the rays are absorbed by the coated closures to sterilize the closure without heating materially the liquid in the container.

7. A method of sterilizing sealed closures of containers filled with oxidizable liquids comprising coating the upper surface of the closure with enamel, and subjecting only the closure to radiations whose wavelength lie in the band beween 6500 and 14000 Angstrom units so that the radiations are absorbed by the closure to sterilize the closure without heating materially the contents of the container.

8. The method of sterilizing the closure of a sealed container containing food stuff comprising, providing the exposed portion of the container with a light reflecting surface, providing the exposed portion of the closure with a light absorbing surface, and exposing the sealed container to infra-red radiations whereby such radiations are absorbed by the closure and reflected from the container to sterilize the closure without heating substantially the contents of the container.

RONALD B. McKINNIS.